Figure 2:
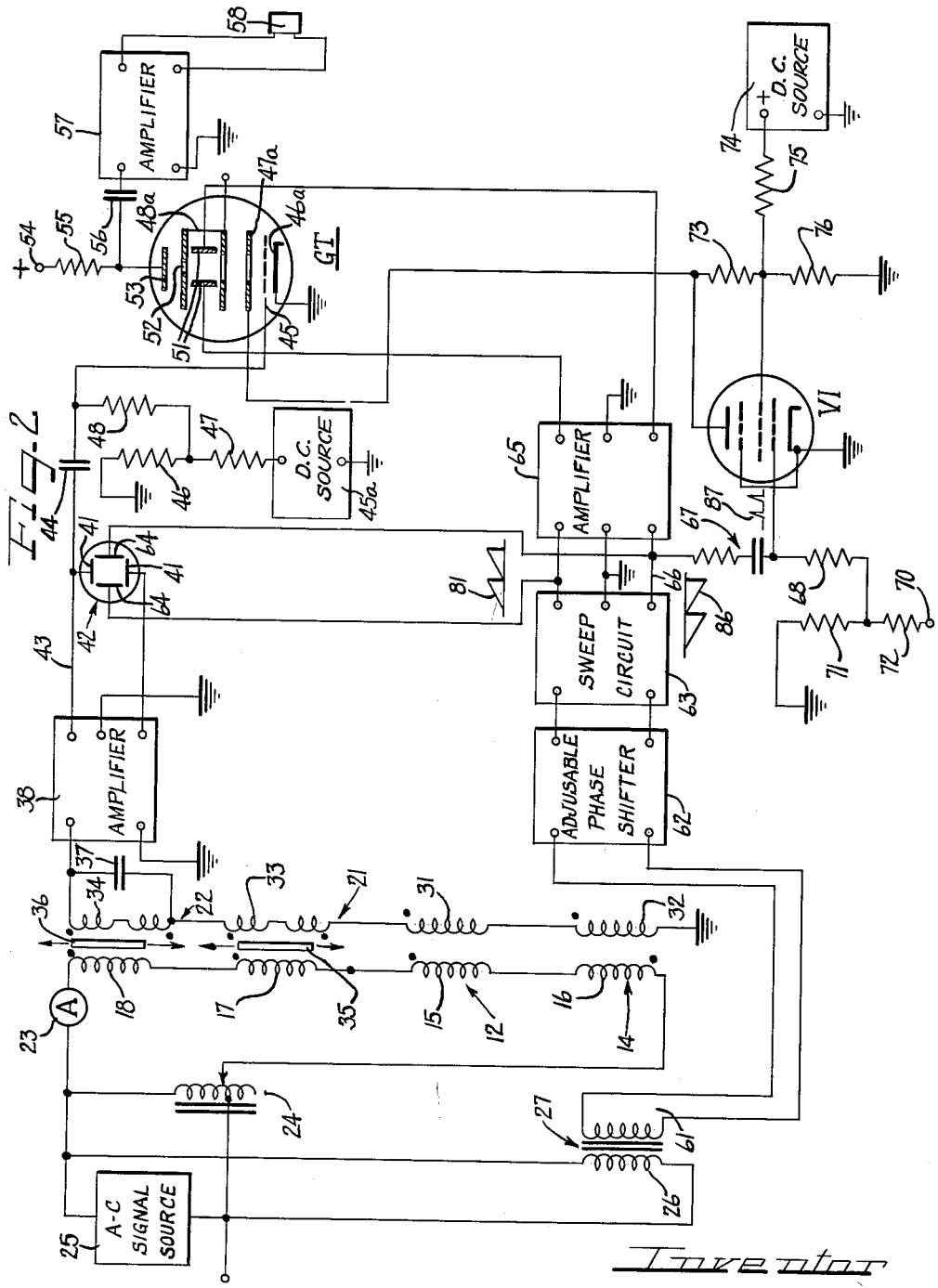

March 14, 1961 F. M. O. FOERSTER 2,975,359
ELECTRICAL APPARATUS
Filed Dec. 4, 1957 2 Sheets-Sheet 1
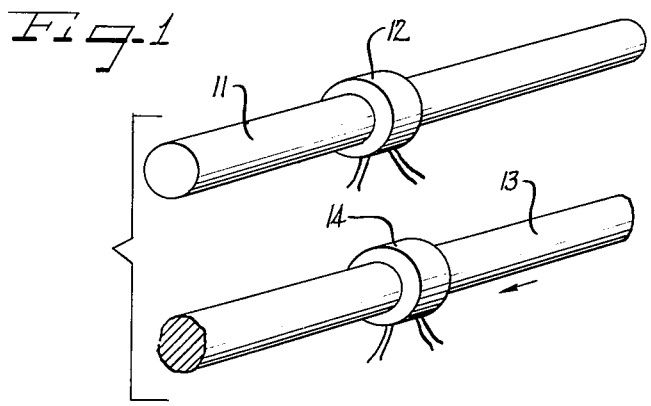
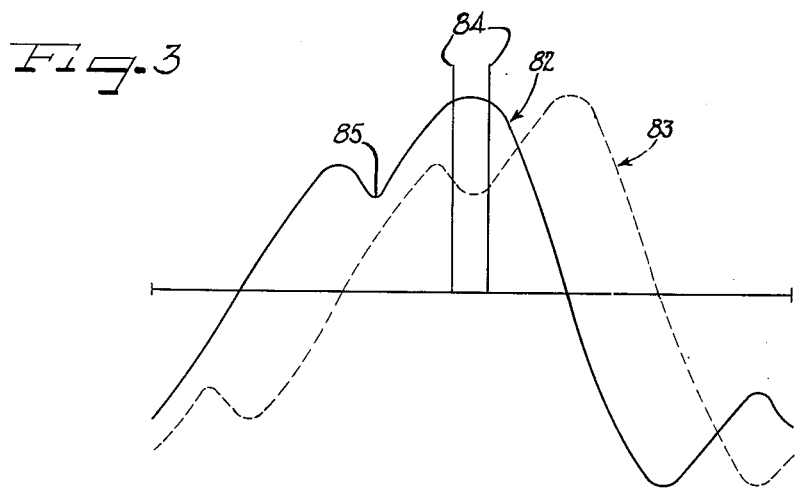
Inventor
Friedrich M. O. Foerster
by Hill, Sherman, Meroni, Gross & Simpson Attys March 14, 1961 F. M. O. FOERSTER 2,975,359
ELECTRICAL APPARATUS
Filed Dec. 4, 1957 2 Sheets-Sheet 2

Inventor
Friedrich M.O. Foerster

United States Patent Office 2,975,359
Patented Mar. 14, 1961

2,975,359

ELECTRICAL APPARATUS

Friedrich M. O. Foerster, 14 Kurrerstrasse,
Reutlingen, Germany

Filed Dec. 4, 1957, Ser. No. 700,715

8 Claims. (Cl. 324—34)

The present invention relates in general to magnetic testing apparatus and more particularly concerns a system employing balanced magnetic detectors wherein a certain portion of the signal waveform derived across the output of the detector is indicative of a particular characteristic of the material being tested. The apparatus is so arranged that it responds only to this portion of the waveform when the associated characteristic is being tested. Thus, when the response indicates that the material under test fails to meet a predetermined specification, this failure is automatically indicated by an output signal which may be utilized to actuate automatic equipment for rejecting the material and/or actuating associated alarm equipment.

A typical magnetic testing system which may incorporate the present improvement includes a pair of balanced transformer detectors, each transformer having a primary and secondary with the primaries serially-connected and energized by a source of an alternating current signal and the secondary windings also serially-connected so that substantially no voltage is derived across the connected-together windings when the loads inductively coupled to the respective transformers exhibit substantially the same characteristics. Typically, one transformer may be a standard transformer and the other a test transformer. A specimen having the desired value of the characteristic to be tested is placed in the center of the standard transformer and when the test specimen occupies a corresponding position in the center of the test transformer, the voltage waveform derived across the connected-together secondary windings is indicative of the deviation of the characteristics of the test specimen from those of the standard. If, for example, only the hardness of the specimens is being tested, only a portion of the signal waveform derived across the secondary windings will be relevant. Whether the sample specimen meets the required criterion may be ascertained by examining the signal waveform on an oscilloscope and visually observing whether the relevant portion of the signal waveform is within the desired tolerances. An operator may then manually indicate the results of the inspection to actuate equipment which rejects the specimen and/or actuates an alarm. With careful inspectors and at relatively slow rates, this method of inspection is satisfactory. However, even careful inspectors are likely to make errors after long periods of continuously monitoring an oscilloscope screen. Moreover, the number of inspections they can carefully make in a specified time interval is limited.

The present invention contemplates and has as a primary object the provision of apparatus for use in cooperation with a magnetic testing system which automatically responds to only a selected portion of a signal waveform to provide an indication of the value of this portion.

Another object of the invention is the provision of a system which permits a selected portion of the signal waveform to be monitored without continuously viewing an oscilloscope.

Still another object of the invention is the provision of means for selecting that portion of a signal waveform which it is desired to automatically monitor.

It is a further object of the invention to provide means for monitoring a selected portion of a signal waveform which responds with an output indication when the portion thus monitored assumes a predetermined value.

It is still a further object of the invention to provide means for providing an exceedingly high degree of balance in a magnetic testing system utilizing balanced transformers.

According to the invention, a pair of balanced transformers with serially-connected primary windings energized by a source of an alternating current signal are arranged with secondary windings serially-connected so that when the load inductively coupled to each transformer is substantially the same, a minimum signal amplitude is derived across the connected-together secondary windings. The signal waveform derived across the connected-together secondary windings is coupled to a gate tube to control the magnitude of the electron beam current emitted by the latter. The latter tube has a pair of deflection plates interposed between the source of the electron beam and a target electrode and is arranged whereby the beam must pass through a restricted region between the deflection plates in order to reach the target electrode. A deflection signal is applied to the deflection plates so as to deflect the beam whereby it occupies the restricted region when the selected portion of the signal waveform it is desired to monitor is then controlling the magnitude of the electron beam current. Means are provided for sensing the flow of current to the target electrode and the magnitude thereof. The latter means thus provides an indication of the value of the characteristic of the material under test which characteristic is indicated by the selected portion of the signal waveform. For example, if the characteristic of the specimen under test differs from the standard characteristic by an amount outside the desired tolerance limits, the selected portion of the signal waveform will produce a relatively high current at the target electrode which may be sensed to actuate an alarm indication and/or rejection of the test specimen.

In a preferred form of the invention, the waveform is simultaneously viewed upon an oscilloscope energized by the same deflection signal which is applied to the deflection plates of the gate tube. Means are provided for varying the phasing of the deflection signal so that the portion of the signal waveform then viewed over a selected range of the oscilloscope is the portion to which the gate tube will respond.

Other features, objects, and advantages of the invention will become apparent from the following specification when read in connection with the accompanying drawing in which:

Fig. 1 illustrates the physical relationship of the balanced transformers when testing a length of rod for a characteristic having a standard value by a standard specimen within the standard transformer; and Fig. 2 is a combined block-schematic circuit diagram of a representative embodiment of the invention; and Fig. 3 illustrates a typical waveform, showing the portions monitored between vertical lines.

With reference now to the drawing and more particularly to Fig. 1 thereof, there is illustrated the physical relationship between the standard and test transformer in a typical magnetic testing system. A standard specimen 11 is positioned within standard transformer 12 while a length of like rod 13 is passed through test transformer 14 in order to compare the value of a particular characteristic with the standard value exhibited by standard specimen 11.

Referring to Fig. 2, the transformers of Fig. 1 are shown identified by the same reference numerals and connected in a representative system which embodies the inventive concepts. Before describing the mode of operation of the system, its physical arrangement will be described. The primary windings 15 and 16 of transformers 12 and 14 respectively are seen to be serially-connected to the primaries 17 and 18 of balancing transformers 21 and 22 respectively and ammeter 23. Primary 16 is connected to the variable tap of auto-transformer 24 whose fixed tap is connected to A.-C. signal source 25 which is also coupled to the primary 26 of phasing transformer 27. One end of auto-transformer 24 is connected to ammeter 23 and the A.-C. signal source 25.

The secondary windings 31 and 32 of transformers 12 and 14 respectively are serially-connected to the balanced differentially wound secondary windings 33 and 34 of balancing transformers 21 and 22, respectively, each of the balancing transformers having slugs 35 and 36 respectively which are adjustable as indicated by the arrows. A capacitor 37 is connected across secondary 34 and the tuned circuit thus formed connected to amplifier 38.

The balanced output from amplifier 38 is applied to the vertical deflection plates 41 of oscilloscope 42. The output on the positive going line 43 of amplifier 38 is coupled by capacitor 44 to the grid 45 of the gate tube GT. Grid 45 is connected by resistor 48 to the biasing network formed by resistors 46 and 47 connected to a D.C. source 45a. Gate tube GT has a cathode 46a emitting electrons which are formed into an electron beam by passing through accelerating electrode 47a. The beam is focused by electrode 48a into a relatively narrow beam which passes through deflection plates 51 and slit 52, when the beam passes through the center of the latter deflection plates, and thence to target electrode 53 which is coupled to a source of positive potential at terminal 54 through resistor 55. Signals from the latter electrode are coupled by capacitor 56 to amplifier 57 which is coupled to relay solenoid 58.

The secondary 61 of phasing transformer 27 is coupled to adjustable phase shifter 62 which supplies a synchronizing signal to sweep circuit 63. The synchronized sweep signal is coupled by the balanced output line to the horizontal deflection plates 64 of oscilloscope 42 and to amplifier 65, the output of the latter being applied by a balanced output line to deflection plates 51 of gate tube GT.

Negative-going line 66 from sweep circuit 63 is connected through differentiator network 67 to the grid of tube VI, the grid of the latter being coupled through resistor 68 to the biasing network formed of resistors 71 and 72 which are connected to a source of negative potential on terminal 70. The plate of tube VI is connected to accelerating electrode 47 of gate tube GT and through resistor 73 to the screen grid of tube VI which is connected to a source of positive potential 74 through resistor 75 which forms a voltage dividing network with resistor 76.

Having described the physical arrangement of the system, its mode of operation will be discussed. Although transformers 12 and 14 are preferably wound so as to be perfectly balanced, slight variations in their construction result in a slight degree of unbalance. Moreover, the phase of the signal actually derived across the connected-together secondary windings of the balanced transformers when a balanced condition should exist frequently differs from the phase of the signal energizing the primary windings by a non-integral multiple of 180 degrees. In order to eliminate the effects of this inherent unbalance, balancing transformers 21 and 22 are employed with their primary windings energized by the same alternating current signal, but having balanced differentially wound secondary windings such that movement of adjustable slugs 35 and 36 produce voltages across secondaries 33 and 34 which may vary from a maximum magnitude of one polarity through zero to a maximum of opposite polarity. With capacitor 37 across secondary winding 34, the voltage derived across the tuned circuit thus formed is 90 degrees out of phase with the voltage derived across secondary winding 33. Hence, there is effectively provided two independently adjustably orthogonal components of a balancing voltage which may be adjusted with adjustable slugs 35 and 36 so as to completely cancel any inherent voltage unbalance derived across the connected together secondary windings 31 and 32 when the associated transformers should be in the balanced condition.

Adjusting the variable tap on auto-transformer 24 controls the current through the primaries 15, 16, 17 and 18 to be a desired value as read on ammeter 23 so that proper magnetizing current for the particular test desired is supplied from A.-C. signal source 25.

When material is being tested, the test signal waveform derived across secondary windings 31 and 32 added to the balance correcting signals derived across windings 33 and 34 are coupled to amplifier 38 which provides a balanced signal output for application to vertical deflection plates 41 of oscilloscope 42. This waveform may be observed on the face of oscilloscope 42 when the horizontal plates 64 of the latter are energized by a sawtooth waveform signal 81 derived from the balanced output of sweep circuit 63.

It is generally desired that only a single cycle of the signal waveform be observed upon oscilloscope 42. Accordingly, the period of the sawtooth signal waveform 81 is preferably the same as that of the A.-C. signal from signal source 25.

The phase of the sawtooth waveform 81 relative to the signal waveform from amplifier 38 and consequently the position of the latter waveform displayed on oscilloscope 42 is controlled by coupling a synchronization signal from A.-C. signal source 25 through transformer 27 and adjustable phase shifter 62 to sweep circuit 63. Varying the phase shift imparted by adjustable phase shifter 62 effects a corresponding horizontal displacement of the waveform observed on the face of oscilloscope 42.

Referring to Fig. 3, there is illustrated a single cycle of a typical signal waveform 82 as it appears on the face of oscilloscope 42. By advancing the phase of the triggering signal with adjustable phase shifter 62, waveform 82 appears to move on the oscilloscope tube face to the new position designated by the broken lines 83. The two vertical lines 84 designate the portion of signal waveform 82 to which the apparatus will respond. Thus, in its original position, the apparatus responds to the maximum value of the signal waveform. When the viewed waveform is in the position designated by the dotted lines 83, the apparatus will respond to the minimum 85. The mode of operation by which this occurs will become apparent from the discussion below.

The same signal waveform applied to horizontal deflection plates 64 is coupled through amplifier 65 to deflection plates 51 of gate tube GT. A stream of electrons from cathode 46a of gate tube GT is formed into a beam and accelerated through the region between deflection plates 51. This beam can only reach target electrode 53 through slit 52; hence, the latter electrode is impinged by the electron beam only when the deflection potential across deflection plates 51 causes the beam to pass substantially through the midway point between the two plates. Since the deflection signal applied to the horizontal deflection plates 64 of oscilloscope 42 and deflection plates 51 are in synchronism, the gate tube beam is thus positioned when the beam of cathode ray tube 42 is tracing out the portion of signal waveform 82 between lines 84.

The same signal waveform applied to vertical plate 41 is coupled from upper line 43 of amplifier 38 to the grid 45 of gate tube GT thereby controlling the magnitude of the beam current. Since at the time the beam of gate tube GT is passing through slit 52 to target electrode 53, the portion of wave form 82 visible between vertical lines 84 is then controlling the magnitude of the beam current which reaches target electrode 53, the voltage drop sensed across resistor 55 is controlled by the selected portion of signal waveform 82 between vertical lines 84. This voltage is applied to amplifier 57 to energize solenoid 58 when the magnitude of the potential drop thus sensed exceeds a predetermined value. The solenoid 58 may be utilized to actuate a relay for indicating an alarm condition and/or activating appropriate apparatus for automatically rejecting the part having a value of the characteristic thus sensed which is outside the desired tolerance limits.

To prevent spurious indications during the retrace interval, means are provided for blanking the electron beam of gate tube GT during the retrace interval. The negative going saw tooth waveform signal 86 on line 66 is differentiated by differentiator 67 to yield the positive spikes 87 which are applied to the grid of blanking tube VI. The latter tube is normally not conductive since it is biased to a negative potential beyond cut off. Accordingly, no plate current is drawn and the potential on the plate of tube VI is relatively high along with the accelerating potential on electrode 47a on gate tube GT. However, when energized by a spike 87, tube VI conducts and the potential upon accelerating electrode 47a drops to such a low level that no beam current reaches slit 52.

It is seen that there has been provided a system which will automatically monitor a selected portion of a signal waveform to yield a response when the monitored portion assumes a predetermined value. While the oscilloscope is especially convenient for selecting the desired portion of the signal waveform, it is apparent that the system will operate without a visual monitor. Moreover, the particular structure of gate tube GT described herein is only an example of a suitable structure. For example, instead of using a slit 52 to determine the region which the beam must pass through to reach the target electrode, the target electrode may be so constructed as to present a relatively narrow cross-section to the beam whereby deflection of the beam on either side of the narrow target strip causes no current to hit the target electrode.

While the exemplary embodiment has been described in connection with a magnetic testing system, it is apparent that the inventive concepts may be applied wherever it is desired to monitor a selected portion of a signal waveform for any reason. It is apparent that those skilled in the art may make numerous modifications of and departures from the specific apparatus described herein without departing from the inventive concepts. Consequently, the invention is to be construed as limited only by the spirit and scope of the appended claims.

What is claimed is:

1. Electrical apparatus comprising, a source of a periodic signal waveform, a source of a sweep signal whose period is an integral multiple of the period of said periodic signal waveform, means for coupling said periodic signal waveform to a first pair of deflection plates of an oscilloscope, means for applying said sweep signal to a second pair of deflection plates of said oscilloscope orthogonal to said first pair whereby said signal waveform may be viewed upon said oscilloscope, a gate tube having a target electrode, a source of an electron beam, deflection electrodes through which said beam passes and a control grid, the structure of said tube being arranged whereby said electron beam reaches said target electrode only when passing through a restricted region between said deflection electrodes, means for coupling the sweep signal applied to the second pair of oscilloscope deflection plates to said deflection electrode, means for coupling said periodic signal waveform to said control electrode, means responsive to said beam impinging upon said target electrode, and means for controlling the relative phase between said periodic signal waveform and said sweep signal.

2. Magnetic testing apparatus comprising, a pair of balanced transformer detectors, means for energizing the primaries of said transformers with alternating current energy from an alternating current signal source, means for combining the signals derived across the secondary windings of said balanced transformer detectors whereby equal loading upon said transformers provides substantially zero signal across said secondaries, means for coupling the signal thus derived to a first pair of deflection plates of an oscilloscope, means for applying a sweep signal to a second pair of deflection plates of said oscilloscope orthogonal to said first pair whereby the signal waveform derived across the connected-together secondary windings may be viewed upon said oscilloscope, a gate tube having a target electrode, a source of an electron beam, deflection electrodes through which said beam passes and a control grid, the structure of said tube being arranged whereby said electron beam reaches said target electrode only when passing through a restricted region between said deflection electrodes, means for coupling the sweep signal applied to the second pair of oscilloscope deflection plates to said deflection electrodes, means for coupling the signal applied to said first pair of deflection plates to said control grid, and means for driving a signal indicative of the beam current which reaches said target electrode.

3. Magnetic testing apparatus comprising, a pair of balanced transformer detectors, means for energizing the primaries of said transformers with alternating current energy from an alternating current signal source, means for combining the signals derived across the secondary windings of said balanced transformer detectors whereby equal loading upon said transformers provides substantially zero signal across said secondaries, means for coupling the signal thus derived to a first pair of deflection plates of an oscilloscope, means for applying a sweep signal to a second pair of deflection plates of said oscilloscope orthoganol to said first pair whereby the signal waveform derived across the connected-together secondary windings may be viewed upon said oscilloscope, a gate tube having a target electrode, a source of an electron beam, a control grid for controlling the intensity of said beam and deflection electrodes through which said beam passes, the structure of said tube being arranged whereby said electron beam reaches said target electrode only when passing through a restricted region between said deflection electrodes, means for coupling the sweep signal applied to the second pair of oscilloscope deflection plates to said deflection electrodes, means for applying to said control grid a signal proportional to that applied to said first pair of deflection plates, and means responsive to said beam reaching said target electrode.

4. Magnetic testing apparatus comprising, a pair of balanced transformers with primary windings energized by an alternating current signal and secondary windings connected together whereby substantially equal loading upon said transformers provides substantially zero signal across the connected-together secondary windings, a tube having a target electrode, a source of an electron beam, a pair of deflection plates interposed between the latter source and said target electrode whereby the beam must pass through said deflection plates, a control grid interposed between said deflection plates and said source of an electron beam whereby the potential on said grid controls the magnitude of the electron beam current, means for coupling the signal waveform derived across the connected together secondary windings to said control grid, and means for selectively applying a signal waveform upon said deflection plates whereby said electron beam may reach said target electrode only when a selected portion of the signal waveform derived across the connected together secondary windings is then energizing said control grid.

5. Magnetic testing apparatus comprising, a pair of balanced transformer detectors and a pair of balancing transformers with primary windings energized by an alternating current signal and secondary windings connected together whereby substantially equal loading upon said balanced transformer detectors provides substantially zero signal across the connected-together secondary windings, means for coupling the signal derived across the connected-together secondary windings to the vertical deflection plates of an oscilloscope, a source of a sweep signal, means for coupling said alternating current signal to said sweep circuit through an adjustable phase shifter whereby the latter controls the relative phase between said sweep signal and the signal applied to said vertical deflection plates, a gate tube having a target electrode, a source of an electron beam, a pair of deflection plates interposed between the latter source and said target electrode whereby the beam must pass through said deflection plates, a slit interposed between said deflection plates and target electrode whereby the beam must pass through said slit to reach said target electrode and a control grid interposed between said deflection plates and said source of an electron beam whereby the potential on said grid controls the magnitude of the electron beam current, means for coupling the signal waveform derived across the connected-together secondary windings to said control grid, means for coupling said sweep signal to the horizontal deflection plates of said oscilloscope and to the deflection plates of said gate tube whereby said electron beam may reach said target electrode only when a selected portion of the signal waveform derived across the connected-together secondary windings is then energizing said control grid, and means for deriving a signal indicative of the electron beam current which reaches said target electrode.

6. Magnetic testing apparatus comprising, a pair of balanced transformers for detecting and a pair of balancing transformers with primary windings of all said transformers energized by an alternating current signal and secondary windings connected together whereby substantially equal loading upon said balanced transformers provides substantially zero signal across the connected-together secondary windings, means for controlling the current which flows through said primary windings, means for coupling the signal derived across the connected-together secondary windings to the vertical deflection plates of an oscilloscope, a sweep circuit for providing a sweep signal, means for coupling said alternating current signal to said sweep circuit through an adjustable phase shifter to synchronize said sweep signal whereby the relative phase between the latter signal and the signal waveform applied to said vertical deflection plates is controlled by said adjustable phase shifter, a gate tube having a target electrode, a source of an electron beam, a pair of deflection plates interposed between the latter source and said target electrode whereby the beam must pass through said deflection plates, a slit interposed between said deflection plates and target electrode whereby said beam must pass through said slit to reach said target electrode and a control grid interposed between said deflection plates and said source of an electron beam whereby the potential on said grid controls the magnitude of the electron beam current, means for coupling the signal waveform derived across the connected-together secondary windings to said control grid, means for coupling said sweep signal to the deflection plates of said gate tube, means for deriving a signal indicative of the beam current which reaches said target electrode, and means for deriving a signal from said sweep signal which renders said gate tube non-conductive during the retrace intervals of the latter signal.

7. In a system for measuring the physical characteristics of test pieces, test coil means arranged to be inductively coupled to a test piece, an alternating current source coupled to said test coil means, a cathode ray tube device including means for developing an electron beam, a control grid for controlling the intensity of said beam, deflection means for deflecting said beam in a transverse direction, first electrode means for normally intercepting said beam and second electrode means arranged to intercept said beam only in a certain position thereof, a sweep circuit coupled to said deflection means, an adjustable phase shifter for coupling said alternating current source to said sweep circuit, means coupling said test coil means to said control grid, and an output circuit coupled to said second electrode means.

8. In a system for measuring the physical characteristics of test pieces, test coil means arranged to be inductively coupled to a test piece, an alternating current source coupled to said test coil means, a cathode ray tube device including means for developing an electron beam, a control grid for controlling the intensity of said beam, deflection means for deflecting said beam in a transverse direction, first electrode means for normally intercepting said beam and second electrode means arranged to intercept said beam only in a certain position thereof, a sweep circuit coupled to said deflection means, an adjustable phase shifter for coupling said alternating current source to said sweep circuit, means coupling said test coil means to said control grid, an output circuit coupled to said second electrode means, a cathode ray oscilloscope tube including a screen, means for producing and impinging the cathode ray beam on said screen and first and second deflection means for deflecting said beam in transverse directions, means coupling said first deflection means to said sweep circuit, and means for applying to said second deflection means the same signal applied to said control grid.

References Cited in the file of this patent

UNITED STATES PATENTS

| | | |
|---|---|---|
| 2,144,476 | Zuschlag | Jan. 17, 1939 |
| 2,152,690 | Hana | Apr. 4, 1939 |
| 2,300,436 | Skellett | Nov. 3, 1942 |
| 2,467,124 | Germann | Apr. 12, 1949 |
| 2,474,812 | Arditi | July 5, 1949 |
| 2,564,063 | Herold | Aug. 14, 1951 |
| 2,570,790 | Gray | Oct. 9, 1951 |
| 2,594,947 | Lynch | Apr. 29, 1952 |